United States Patent
Scholdstrom

[15] 3,656,828
[45] Apr. 18, 1972

[54] LIGHT SIGNAL APPARATUS

[72] Inventor: Karl Otto Ragnar Scholdstrom, Lidingo, Sweden

[73] Assignee: AGA Aktiebolag, Lidingo, Sweden

[22] Filed: Dec. 17, 1969

[21] Appl. No.: 885,799

[30] Foreign Application Priority Data

Jan. 24, 1969  Sweden...................................934/69

[52] U.S. Cl..................................350/7, 356/138, 356/153, 356/172
[51] Int. Cl......................................................G02b 17/00
[58] Field of Search..................................350/6, 7, 272, 285; 250/233-236, 202, 203; 178/7.6; 356/138, 153, 172

[56] References Cited

UNITED STATES PATENTS

| | | | |
|---|---|---|---|
| 2,997,598 | 8/1961 | Gramm | 350/7 |
| 3,170,982 | 2/1965 | Hemstreet et al. | 350/102 |
| 3,426,144 | 2/1969 | Roth | 350/7 UX |

*Primary Examiner*—David Schonberg
*Assistant Examiner*—Michael J. Tokar
*Attorney*—Larson, Taylor and Hinds

[57] ABSTRACT

A pair of oppositely directed beams of light are rotated about an axis. The direction of the beams has a small deviation from a plane normal to the axis, whereby flashes of equal strength from both beams are produced in the normal plane at twice the frequency of revolution, thereby indicating the normal plane to a viewer.

In similar manner, a line may be indicated by making a beam rotate about an axis having a small deviation from that of the beam.

4 Claims, 2 Drawing Figures

PATENTED APR 18 1972 3,656,828

INVENTOR
KARL O. R. SCHÖLDSTRÖM

BY *Larson and Taylor*

ATTORNEYS

LIGHT SIGNAL APPARATUS

BACKGROUND OF THE INVENTION

The invention relates to a light signal apparatus for enabling an observer to ascertain by sight whether he is within a certain spatial region, such as a predetermined horizontal plane, or not.

It is known in radio signalling to emit a pair of radio signals defining partially overlapping regions in space and having different signal characters. A listener can then ascertain from the signal character whether he is in the region of one or the other beam and the signal characters may be such as to mingle into an easily definable signal in the region of overlapping when the two signals are of equal strength. For instance, the listener may hear the Morse code signal N in one beam and A in the other and a continuous tone in the region of equal strength.

SUMMARY OF THE INVENTION

The present invention implies a modification of the known principle adapted for the human eye. According to the invention a light emitter is provided for generating a beam of visible light having a portion of highest intensity. Means are provided for scanning the portion of highest intensity of the beam over an adjacent region to the spatial region to be defined symmetrically with regard thereto. The spatial region to be indicated can then be distinguished by the eye from the adjacent region, within which there is a lower intensity of the light. Owing to the symmetrical scanning, this lower intensity, which may be represented by a total absence of light, is surrounded by a higher light intensity and can easily be discerned. In a preferred embodiment of the invention, light pulses of substantially lower frequency are produced within the adjacent region than in the region to be indicated, so that the observer will see a continuous light within the latter and a more pronounced flicker the farther he moves out of it. This principle can be used owing to the well-known slowness of response or threshold frequency of the human eye.

THE DRAWING

FIG. 1 is a schematic diagram of an embodiment of the invention for indicating a plane, and FIG. 2 is a detail view of a modified embodiment for indicating a line.

DESCRIPTION OF EMBODIMENTS

Figure 1:
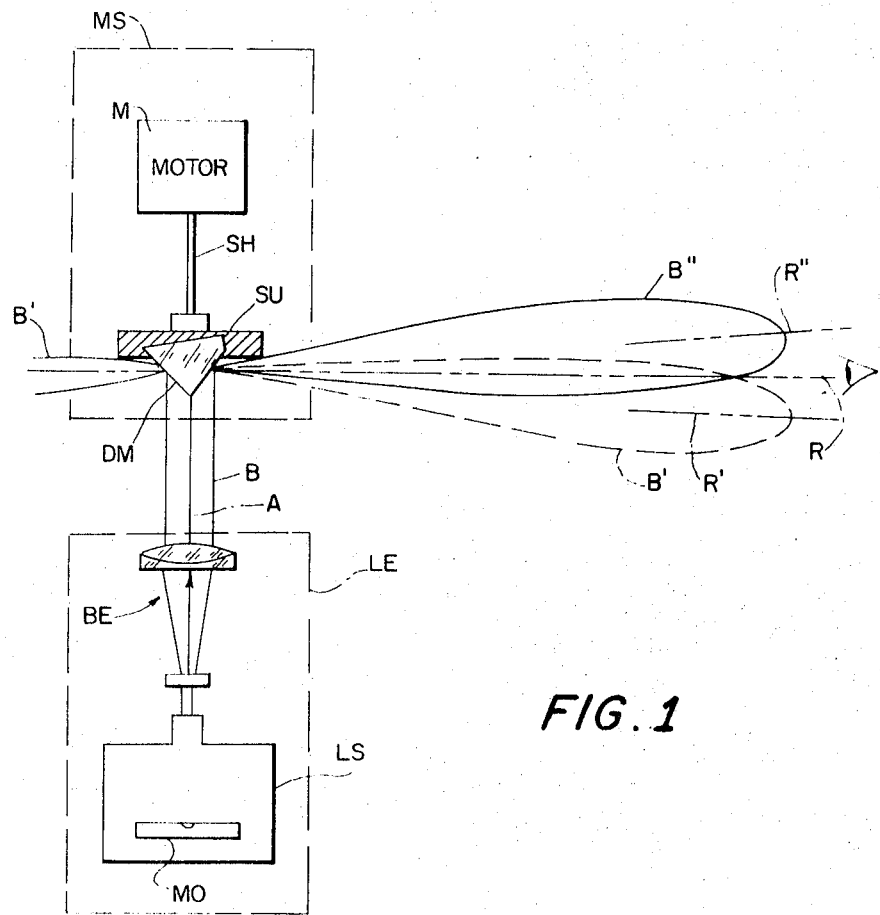

In FIG. 1, LE designates a light emitter for producing a beam of light B. The emitter comprises a laser light source LS generating a beam of nearly parallel light which is passed through a beam expander BE. A typical value of divergence for a laser beam is 1 mR (1 m/km) and of the beam diameter 1 mm. The expander BE is of a type well known within the art comprising a combination of a negative and a positive lens and transforms the beam into one having, for instance, a divergence of 0.1 mR and a diameter of 10 mm. This facilitates the subsequent splitting of the beam. Otherwise, the expander is not necessary, and it may even be preferable not to use one in some instances, since the more divergent beam is easier to find. A means for orienting the apparatus is shown in the form of a level MO. A similar level may be provided at right angles to the one shown, permitting the emitted beam to be adjusted to have its axis A accurately vertical. Adjustable supports of well-known type may be provided on the instrument for this purpose and are not shown, as they form no part of the present invention.

A laser beam, as is well known, has a portion of highest intensity in the vicinity of the center thereof.

The apparatus also comprises means MS for scanning the portion of highest intensity of the beam over a region R', R'', which is adjacent and symmetrical relative to the spatial region R to be indicated. The scanning means MS comprises a deflecting means DM in the form of a prism having a rectangular edge which cuts the beam B at the center thereof and which has a slight inclination relative to the axis A. The beam B is thus split into two half-beams. One of these is designated B'' and is represented as a lobe which is symmetrical about a line R''. The origin of the lobe is at the intersection of the line R'' with the reflecting surface of the prism DM and the length of the radius vector from the intersection to a point of the lobe represents the strength of the light in the direction of the vector. The distribution is seen to correspond to a highest intensity of the beam in the central position thereof.

The prism DM is held in a support SU which is attached to the shaft SH of a motor M, which serves to rotate the prism. The shaft SH is coaxial with the axis A.

The second half-beam B' is directed opposite to the half-beam B''. The second half-beam B' is also shown in dashed lines on the drawing in the position B' which it will take after one-half revolution of the prism DM about the axis A.

The spatial region to be indicated is the horizontal plane corresponding to the line R. To the eye of an observer, if located in this plane, a flash of light will appear twice during one revolution, one flash being produced by the half-beam B'' in the position shown on the drawing and the other being produced by the half-beam B' one half-turn later. On the other hand, if the eye is in the direction R' or R'', it will see only one of the half-beams, which will appear once for each revolution.

As a result of this, therefore, light flashes are produced in the direction R with a frequency of 2f and in the direction of R' or R'' with the frequency f, if f is the number of revolutions per minute of the motor M.

At a point between R and R'', both light flashes will be present, however the strength of the flash from the half-beam B'' is stronger than that from B'. By a suitable choice of the angle between R' and R'' it is possible to achieve a great difference in strength between the two beams even for a small deviation of the eye from the direction R.

It is clear that the FIG. 1 apparatus can easily be modified for indicating a plane of adjustable inclination with the aid of graduated circles and bearings for adjustably supporting the apparatus, thereby enabling adjustment of the inclination of the axis of rotation A.

The frequency f may have a value such as 20cps, which will cause the frequency 2f to appear as continuous light to the eye of the observer.

Figure 2:
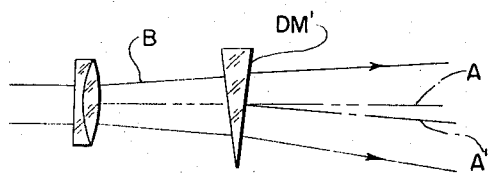

FIG. 2 is a detail view of a modified embodiment for indicating a line. The beam B is emitted with its axis A directed along the line to be indicated and a wedge DM' is placed with its plane of symmetry perpendicular to the axis A and rotatable about it, whereby the axis A' of the deflected beam will generate a conical surface and an eye which is placed in the direction A' will see one flash for each revolution of the wedge. To an eye placed in the direction A, however, the light will appear continuous, if the beam is symmetrical about its axis of rotation A.

I claim:

1. A light signal apparatus for visibly indicating a spatial plane, comprising: a light emitter for generating a beam of light and scanning means comprising optical deflecting means for receiving said beam and producing first and second beams substantially orthogonal to said beam and means for rotating said optical deflecting means to provide scanning of said first and second beams, said optical deflecting means including means for causing scanning of the highest intensity portion of the first beam within a small angle with respect to said spatial plane so that a relatively low intensity portion of said first beam is scanned through the said spatial plane and for causing scanning of the highest intensity portion of the second beam within a small angle with respect to the said spatial plane and on the opposite side of said spatial plane from the angle through which the first beam is scanned so that a relatively low intensity portion of said second beam is scanned through the said spatial plane, said first and second planes being located symmetrically relative to said spatial plane and said relatively low intensity portion of said first beam overlapping said relatively low intensity portion of said second beam.

2. A light signal apparatus as claimed in claim 1 in which said optical deflecting means comprises an offset prism for splitting said light beam into said first and second beams and for directing said first and second beams in opposite directions.

3. A light signal apparatus as claimed in claim 1, in which said scanning means comprises means for scanning said spatial plane at a first frequency and said adjacent planes at a second, lower frequency.

4. A light signal apparatus as claimed in claim 3, in which said first frequency is above the threshold frequency of the human eye and said second, lower frequency is below the threshold frequency of the human eye.

* * * * *